UNITED STATES PATENT OFFICE.

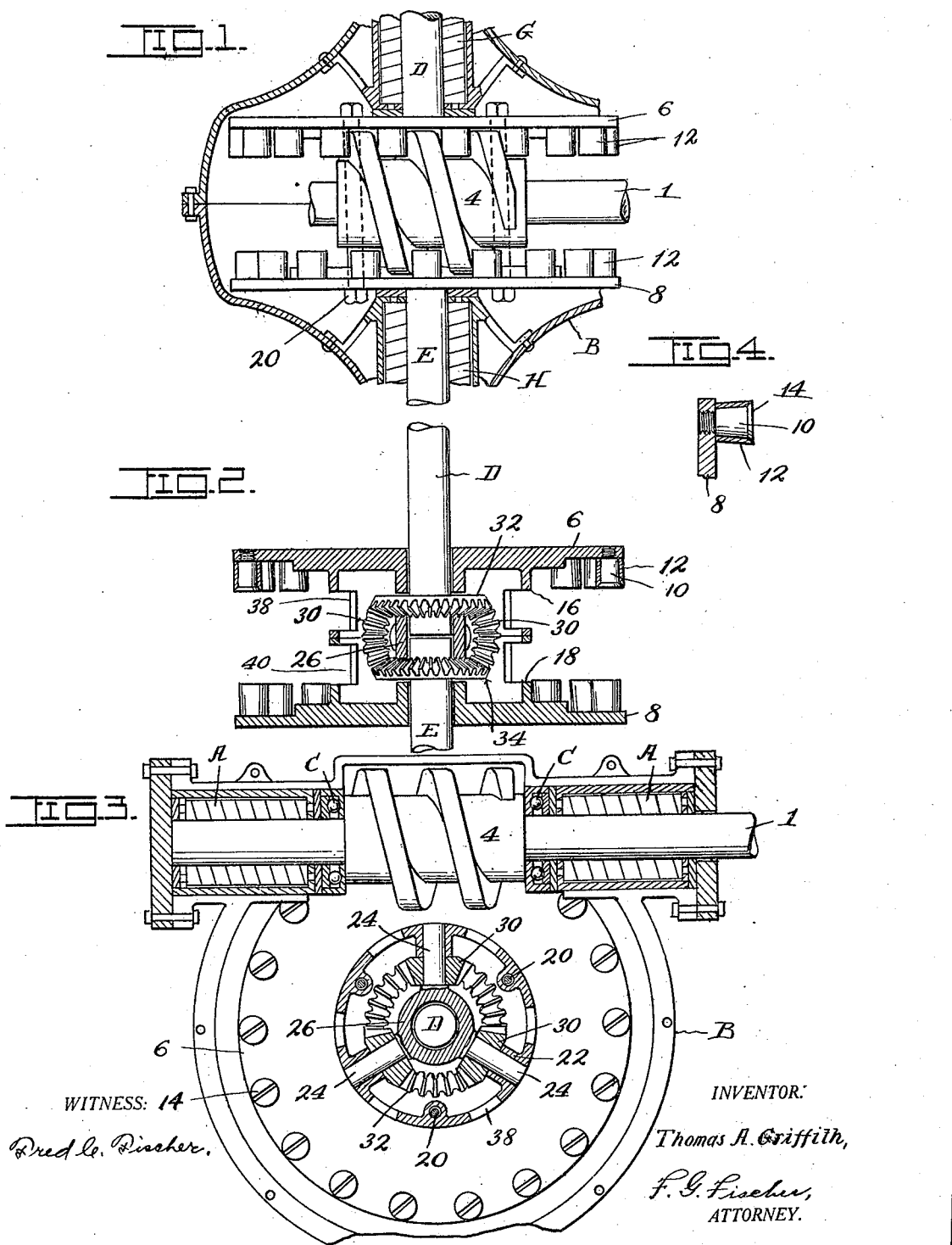

THOMAS A. GRIFFITH, OF KANSAS CITY, MISSOURI.

DRIVING MECHANISM.

1,405,408.  Specification of Letters Patent.  Patented Feb. 7, 1922.

Application filed December 19, 1919. Serial No. 346,037.

*To all whom it may concern:*

Be it known that I, THOMAS A. GRIFFITH, a citizen of the United States, residing at Kansas City, in the county of Jackson and State of Missouri, have invented certain new and useful Improvements in Driving Mechanism, of which the following is a specification.

My invention relates to driving mechanisms for self-propelled vehicles such as automobiles, trucks, etc., and the invention pertains more particularly to the differential whereby power is transmitted from the propeller shaft to the rear axle shafts of the vehicle.

One object of the invention is to provide a new driving mechanism which will transmit power more efficiently and reduce wear and distribute the stresses more uniformly over the different parts of the mechanism than heretofore.

Other objects of the invention will hereinafter appear, and in order that said invention may be fully understood, reference will now be made to the accompanying drawings, in which:

Fig. 1 is a plan view of the driving mechanism with the differential housing in section.

Fig. 2 is a horizontal section of two driving wheels forming a part of the invention, with associated elements in plan view.

Fig. 3 is a vertical section of the driving mechanism and associated parts.

Fig. 4 is a detail view of one of the antifriction rollers.

Referring now in detail to the various parts, 1 designates a drive shaft corresponding to the propeller shaft of an automobile or truck. Said shaft 1 is journaled in antifriction bearings A mounted in the differential housing B.

D and E designate a pair of independent axle shafts journaled in antifriction bearings G and H mounted in the differential housing B.

4 designates the drive worm keyed or otherwise fixedly-mounted upon the shaft 1, which latter is provided with end-thrust bearings C interposed between the ends of said drive worm 4 and the adjacent ends of the bearings A.

6 and 8 designate a pair of wheels or disks disposed at opposite sides of the drive worm 4 and loosely mounted upon the axle shafts D and E, respectively. Each wheel is provided at its side adjacent to the drive worm 4 with an annular series of pins 10, which may be secured in any suitable manner to their respective wheel, being preferably threaded therein as disclosed on Figs. 2 and 4. Each pin 10 is provided with a roller 12, which, like the pin 10, tapers towards its inner end and is held in place by the adjacent side of the wheel and a conical shoulder 14 at the outer end of said pin. By thus tapering the rollers 12 they have a tendency to hug the thread or threads of the drive worm 4 and remain in gear therewith instead of spreading the wheels 6 and 8 apart as would be the case if said rollers were tapered toward their outer ends instead of toward their inner ends as shown.

The disks or wheels 6 and 8 are provided at their adjacent sides with annular flanges 16 and 18, which are held firmly in engagement with each other by transverse bolts 20 extending through said flanges and the respective wheels. The flanges 16 and 18 have bearings 22 to receive the studs 24 of a spider consisting of said studs and a ring 26 to which the studs are rigidly secured. The ring 26 loosely embraces the adjacent ends of the axle shafts D and E, and the studs 24 which are spaced equal distances having pinions 30 journaled thereon and intermeshing with bevel gears 32 and 34 keyed or otherwise fixed upon the axle shafts D and E, respectively, to drive the same. The flanges 16 and 18 of the wheels 6 and 8, have openings 38 and 40, respectively, to freely admit a lubricant to the enclosed gearing.

With the parts constructed and arranged as shown and described, it will be understood that when the shaft 1 is in operation it will drive the worm 4, which in turn, drives the wheels 6 and 8. As the wheels 6 and 8 rotate, they carry the spider 26 and the pinions 30 therewith which being interlocked with the bevel gears 32 and 34, cause the same to rotate and propel the axle shafts D and E. In turning a corner, we will assume that the greater resistance occurs on shaft D. In this event, the wheels 6 and 8 will rotate with the shaft E, which offers the least resistance and the differential pinions 30 will turn on their studs 24 and run over the surface of the bevel gear 32, thus permitting it to remain stationary or rotate at a lower speed than the shaft E. Likewise if the shaft E meets with the greater resistance in going around a corner, the differential pinions 30 will travel around the bevel gear 34. When the vehicle is going straight ahead, the pinions 30 remain stationary on the studs 24, and being interlocked with the bevel gears 32 and 34, travel around therewith and drive the same at equal speeds.

As disclosed on Fig. 1, a plurality of rollers on each wheel 6 and 8 are in simultaneous engagement with the thread or threads of the drive worm 4 and hence distribute the strain and wear more uniformly than where the usual driving ring is employed, and by providing two wheels 6 and 8, double strength is had and lateral stresses on the drive worm 4 are, practically, eliminated. Furthermore, should either wheel 6 or 8 become disabled while in use, the other will suffice to drive the axle shafts D and E through the intervening gearing and thus enable the vehicle to reach its destination under its own power.

From the foregoing description it will be readily understood that I have provided a driving mechanism embodying the advantages above pointed out, and while I have shown and described the preferred construction, combination and arrangement of parts, I reserve the right to make such changes as properly fall within the spirit and scope of the claim.

Having thus described my invention, what I claim and desire to secure by Letters Patent, is:

A driving mechanism consisting of a worm having one or more threads, a pair of disks connected together and arranged at opposite sides of said worm, an annular series of pins projecting from a vertical face of each disk to successively engage the worm and be driven thereby, abutting annular flanges integral with the adjacent sides of the disks, bolts rigidly connecting the disks together, a spider mounted in said flanges to rotate therewith, bevel gears spaced equal distances apart and journaled on the spider, a pair of bevel gears enclosed in the flanges and engaging opposite sides of the first-mentioned gears to be driven thereby at equal or differential speeds, and two shafts of equal size having abutting ends and driven independently of each other by said pair of bevel gears.

In testimony whereof I affix my signature, in the presence of two witnesses.

THOMAS A. GRIFFITH.

Witnesses:
F. G. FISCHER,
L. J. FISCHER.